United States Patent Office 3,590,070
Patented June 29, 1971

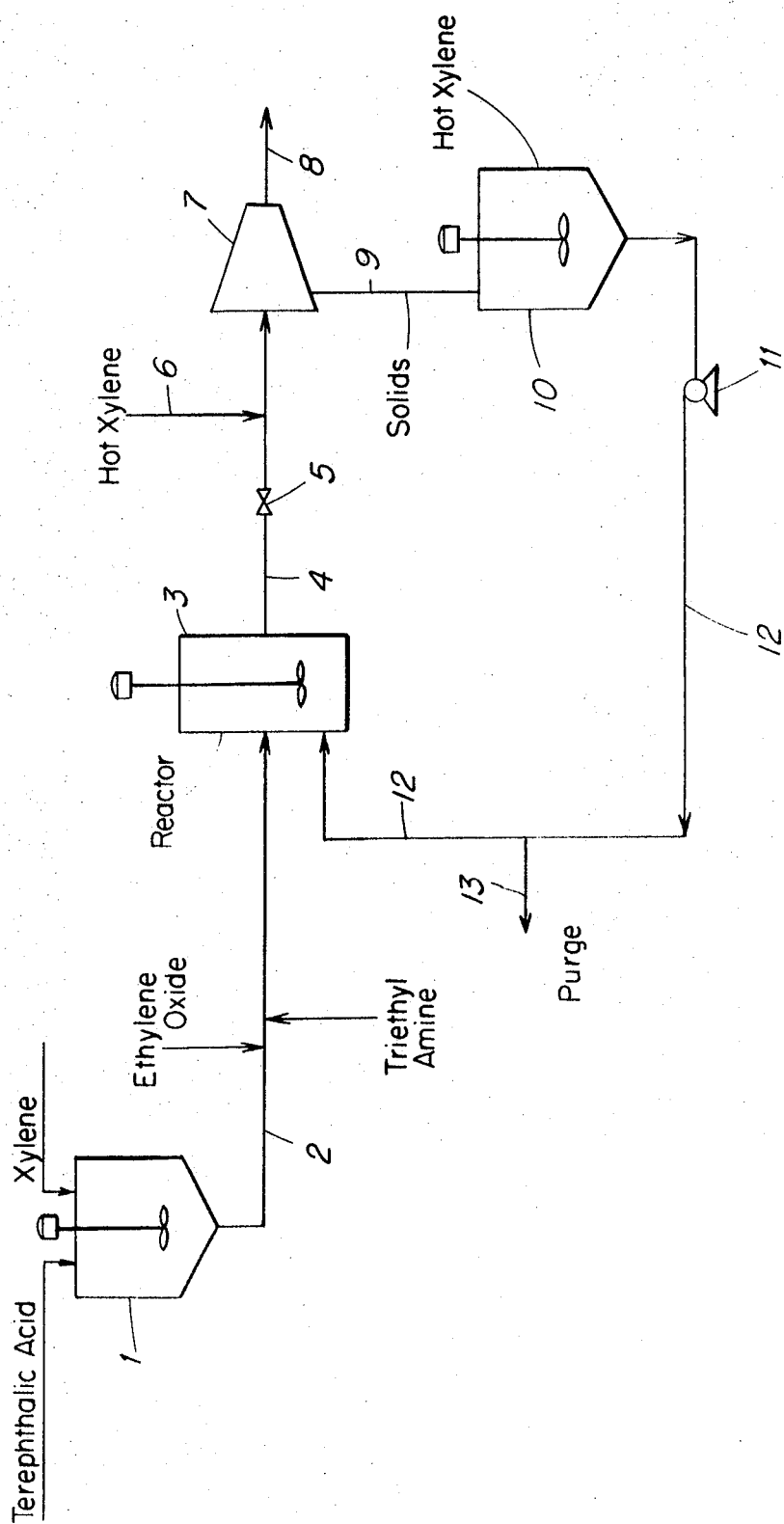

3,590,070
RECYCLE OF TEREPHTHALIC ACID IN THE PRODUCTION OF A BIS(2-HYDROXYALKYL) TEREPHTHALATE
Preston K. Martin and John P. Mireur, Corpus Christi, Tex., assignors to Celanese Corporation, New York, N.Y.
Filed June 3, 1968, Ser. No. 733,849
Int. Cl. C07c 69/82
U.S. Cl. 260—475P                 13 Claims

ABSTRACT OF THE DISCLOSURE

A process for reacting terephthalic acid with an alkylene oxide in an inert halohydrocarbon or alkylbenzene liquid reaction medium wherein the terephthalic acid-containing wetted solids separated from the reaction zone are recycled by slurry the wetted solids in the liquid reaction medium and pumping them to the reaction zone. In recycling the wetted solids of the slurry, care must be taken to avoid temperatures of 90–105° C. in the case of an alkylbenzene liquid medium or 80 to 100° C. when using a halohydrocarbon liquid medium.

BACKGROUND OF THE INVENTION

The present invention relates to an improved process for the production of a bis(2-hydroxyalkyl) terephthalate. More particularly the present invention relates to an improvement whereby unreacted terephthalic acid may be recovered from a process wherein an alkylene oxide is reacted with terephthalic acid to form a bis(2-hydroxyalkyl) terephthalate.

Bis(2-hydroxyalkyl) terephthalates are well known compounds useful in the production of polyesters such as poly(ethylene terephthalate). Various processes have been reported for making these bis(2-hydroxyalkyl) terephthalates, one of the more desirable methods being by the reaction of terephthalic acid with an alkylene oxide. Such reactions may be conducted by suspending the terephthalic acid in an inert liquid reaction medium such as water, an alkylbenzene, or a halohydrocarbon and then reacting the slurried terephthalic acid with the alkylene oxide so as to form the bis(2-hydroxyalkyl) terephthalate which is readily soluble in the liquid medium being used. When an alkylbenzene or a halohydrocarbon is used as the inert liquid reaction medium, such reactions are usually conducted by suspending the terephthalic acid, preferably in a finely divided form, in from about 1.0 to 20.0 preferably 2.5 to 12 times its weight of the reaction medium and then reacting the thus suspended terephthalic acid with the alkylene oxide in the presence of a catalyst. The bis(2-hydroxyalkyl) diester product, unlike the dibasic acid starting material, is fairly soluble in the reaction medium at the temperatures involved and therefore when sufficient amounts of the liquid reaction medium are used the diester product formed in the reaction zone will be entirely soluble in the reaction medium. In such situations the liquid phase of the reaction zone effluent will be a single liquid phase which is a solution of bis(2-hydroxyalkyl) terephthalate in the liquid medium. However in some cases the amount of xylene charged to the reaction zone will not be sufficient to dissolve all the diester product and therefore two liquid phases will be present in the effluent—one phase being a solution of the diester in the liquid medium and the other phase comprising mainly molten diester.

Catalysts suitable for effecting the reaction of terephthalic acid with an alkylene oxide can be those which are insoluble such as an ion exchange resin, but are preferably those which are soluble, i.e. the catalyst compound itself is soluble or forms soluble compounds, salts, complexes, etc. with the reactants. Some specific classes of catalyst which may be used are amines, arsines, stibines, phosphines, or quaternary ammonium compounds. The preferred catalysts are the amines especially the tertiary amines such as pyridine, triethylamine, tri-n-propyl amine, N-N-dimethylaniline, 2,6-dimethylpyridine and the like. Some other specific catalysts which may be used include propyl amine, hexyl amine, diethyl amine, piperidine, triethylphosphine, tripropylphosphine, diethylphenylphosphine, triphenylarsine, triphenylstibine, benzyl trimethyl ammonium hydroxide, decyl trimethyl ammonium hydroxide, and dodecyl trimethyl ammonium hydroxide. The amount of catalyst should generally be from about 0.01 to 0.1 mole per mole of the terephthalic acid but is preferably from about 0.01 to 0.05 mole per mole of the terephthalic acid.

The temperature used in reacting the terephthalic acid with the alkylene oxide may vary from about 110–200° C. but is preferably from 120–155° C. The pressure may range from subatmospheric to superatmospheric, the only requirement being that the pressure be sufficient to maintain a liquid phase of the liquid reaction medium. Generally the pressure will be from 1 to 30 atmospheres. The residence time of the reactants in the reaction zone will usually be 2 to 180 minutes.

The alkylene oxides are usually present in amounts of from about 1.7 to 5.0 moles per mole of the terephthalic acid and are preferably present in amounts of from about 1.9 to 4.0 moles per mole of the terephthalic acid. The alkylene oxide used as reactant in such processes is preferably ethylene oxide although other suitable alkylene oxides include those vicinal oxides having from 2 to 6 carbon atoms such as 1,2-propylene oxide and 1,2-butylene oxide.

The alkylbenzenes used as inert liquid reaction mediums in general are those containing 7 to 10 carbon atoms although those containing 8 to 9 carbon atoms are preferred. Some particular alkylbenzene liquid mediums include ethylbenzene, toluene, xylene, cumene, mesitylene and mixtures thereof, with a $C_8$ alkylbenzene liquid medium containing at least 60% by weight of xylene being the preferred liquid medium. By xylene is meant not only ortho, meta, and para-xylene but mixtures thereof. Halohydrocarbons suitable as inert liquid reaction mediums are generally those containing from 2 to 10 carbon atoms and being free of ethylenic or acetylenic unsaturation. Suitable chloroalkanes and chloroaromatics include 1,2,2-trichloroethane, chlorobenzene, and p-chlorotoluene.

In reacting the terephthalic acid with the alkylene oxide, the acid usually is not 100% reacted with the alkylene oxide and thus the reaction product or reaction zone effluent will contain some solid, unreacted terephthalic acid which must be separated by filtration or centrifugation prior to he recovery of the diester product. It is obvious that in a commercial process it would be economically desirable to recover this unreacted terephthalic acid and recycle it to the reaction zone, however, in the processes utilizing an alkylbenzene or a halohydrocarbon reaction medium, no method has been reported which is satisfactory on a commercial scale. It has been found by us that the wetted solids which are recovered by centrifugation or filtration from such processes consist of a solid cake or lumps wetted with the liquid reaction medium and contain mainly terephthalic acid but also contain amounts of esters and relatively small amounts of catalyst. The esters found in the wetted solids consist of some bis(2-hydroxyalkyl) terephthalate as well as other esters such as mono (2-hydroxyethyl) terephthalate. These esters will usually be present in the wetted solids in amounts of from about 0.05 to 1.0 part by weight per part by weight of terephthalic acid present, but usually will be present in amounts of from about 0.20 to 0.75 part per part of terephthalic acid. Thus typical wetted solids might contain on a dry basis about 75 weight percent of terephthalic acid and 25 weight percent esters, there also being other impurities present in relatively small amounts, e.g. 0.1 percent. In cases where water is the inert reaction medium, it has been found that the wetted solids may be easily recycled to the reaction zone by merely slurrying the wetted solids in water and pumping the aqueous slurry to the reaction zone without particular attention to process conditions. However it has been found that in the case of an alkylbenzene or halohydrocarbon reaction medium serious problems of sticking and plugging are encountered in attempting to reslurry and recycle the wetted solids separated from the reaction zone effluent.

SUMMARY

The sole figure represents a schematic flowsheet of a specific embodiment of the present invention.

It is an object of the present invention to provide a method whereby unreacted terephthalic acid may be recycled to the reaction zone in a process wherein terephthalic acid suspended in an alkylbenzene or halohydrocarbon liquid medium is reacted with an alkylene oxide so as to produce a bis(2-hydroxyalkyl) terephthalate. Additional objects will become apparent from the following description of the present invention.

These and other objects are accomplished by the present invention which in one of its embodiments is an improvement in a process for the production of a bis(2-hydroxyalkyl) terephthalate wherein terephthalic acid suspended in an alkylbenzene or an inert halohydrocarbon liquid medium is reacted in a reaction zone maintained at a temperature of from 110–200° C. with an alkylene oxide of two to six carbon atoms in the presence of a catalyst so as to produce a bis(2-hydroxyalkyl) terephthalate, which improvement comprises (a) passing the effluent of said reaction zone to a separation zone wherein wetted solids comprising unreacted terephthalic acid are separated from said effluent, said effluent and said separation zone being maintained at above 105° C. when said liquid medium is an alkylbenzene and above 100° C. when said liquid medium is a halohydrocarbon, (b) combining said wetted solids with an amount of said liquid medium sufficient to form a slurry containing from about 3 to 25 percent by weight of solids, the temperature of the liquid medium combined with the wetted solids being such that the temperature of the combined wetted solids and liquid medium is at least 105° C. when the liquid medium is an alkylbenzene or a temperature of at least 100° C. when the liquid medium is a halohydrocarbon, (c) vigorously agitating the resulting combination of wetted solids and liquid medium so as to beat the wetted solids into particles capable of being pumped, and (d) pumping the combined liquid medium and wetted solids to the said reaction zone, the temperature of the combined wetted solids and liquid medium during said agitation and pumping being maintained at all times above 105° C. when using an alkylbenzene or above 100° C. when using a halohydrocarbon liquid medium. In another embodiment the present invention comprises an improvement in the above-mentioned process which improvement comprises (a) passing the effluent of said reaction zone to a separation zone wherein wetted solids comprising unreacted terephthalic acid are separated from said effluent, said effluent and said separation zone being maintained at above 105° C. when said liquid medium is an alkylbenzene and above 100° C. when said liquid medium is a halohydrocarbon, (b) quickly quenching said wetted solids by combining said wetted solids with an amount of said liquid medium sufficient to form a slurry containing from about 3 to 25 percent by weight of solids, the temperature of the quench liquid being such that the combined wetted solids and liquid medium is no greater than 90° C. when the liquid medium is an alkylbenzene or no greater than 80° C. when the liquid medium is a halohydrocarbon, (c) vigorously agitating the resulting combination of wetted solids and liquid medium so as to beat the wetted solids into particles capable of being pumped, and (d) pumping the combined liquid medium and wetted solids to said reaction zone, the temperature of the combined wetted solids and liquid medium being maintained at all times during said agitation and pumping below 90° C. when using an alkylbenzene or below 80° C. when using a halohydrocarbon liquid medium.

DESCRIPTION OF THE PREFERRED EMBODIMENTS

As may be seen from the above, the recycle of unreacted terephthalic acid may be accomplished in one of two manners both of which call for combining the wet solids removed from the reaction zone effluent with a liquid which is the same as the liquid medium utilized in the reaction of the terephthalic acid with the alkylene oxide. Thus where xylene is utilized as the inert reaction medium, xylene will be used in recycling the terephthalic acid according to the present invention. Likewise if chlorobenzene is utilized as the inert reaction medium, chlorobenzene will be utilized in recycling the terephthalic acid. The present invention is based mainly on the discovery that plugging and sticking problems can be avoided in recycling the wet solids removed from the reaction zone effluent as a slurry in an alkylbenzene or halohydrocarbon liquid medium only if the temperature of the combined solids and liquid medium is not allowed to come within the range of about 90–105° C. in the case of an alkylbenzene liquid medium or 80–100° C. in the case of a halohydrocarbon liquid medium. In addition to the critical control of the temperature, the mixture of solids to be recycled and liquid medium must be vigorously agitated by mechanical means so as to beat the solids into relatively small lumps or particles capable of being pumped. Without both the temperature control and the vigorous agitation the process is ineffective to prevent plugging and sticking. That the wetted solids separated from the reaction zone effluent cannot be recycled as a slurry in an alkylbenzene or halohydrocarbon liquid medium if allowed to come within the above stated ranges of temperature is surprising since crude or fiber grade terephthalic acid such as is used as fresh feed to the reaction zone of the present process may be slurried in these liquid mediums and pumped without encountering sticking and plugging problems at these temperatures. Also as was pointed out above no problem is encountered with plugging and sticking, etc. when reslurrying in water the wetted solids separated from a reaction zone effluent of a process wherein water is used as the liquid reaction medium. Since crude or fiber grade terephthalic acid may be readily slurried in alkylbenzene or halohydrocarbons without encountering stickiness problem, the problems encountered in reslurrying the wetted solids recovered from a process utilizing an alkylbenzene or halohydrocarbon liquid medium are apparently due to the presence in the wetted solids of materials such as were mentioned above, i.e., bis(2-hydroxyalkyl) terephthalate, monohydroxyethyl terephthalate, catalyst and the like.

The preferable manner for conducting the process of the present invention is the first described above, that is, the process wherein the terephthalic acid-containing solids are contacted with a hot stream of liquid reaction medium having a temperature of at least 105° C. when the liquid medium is an alkylbenzene or at least 100° C. when the liquid medium is a halohydrocarbon. In order to illustrate a specific embodiment of the present invention reference is made to the sole figure which illustrates a process where terephthalic acid suspended in a xylene reaction medium is reacted with ethylene oxide in the presence of a tertiary amine catalyst so as to produce bis (2-hydroxyethyl) terephthalate. The xylene reaction medium consists of about 28% p-xylene, 46% m-xylene, 9% o-xylene and 16% ethylbenzene as well as about 1% toluene.

Referring now to the figure, terephthalic acid and xylene are added to slurry tank 1, which is equipped with a stirrer so as to suspend the terephthalic acid in the xylene, the weight ratio of xylene to terephthalic acid being about 9:1. The suspension of terephthalic acid in xylene is then removed from slurry tank 1 through line 2 and combined with ethylene oxide and triethylamine catalyst before passing to reactor 3. The ethylene oxide is added in an amount corresponding to about 2.5 moles of ethylene oxide per mole of terephthalic acid while the triethylamine catalyst is added in an amount of about 0.09 mole per mole of terephthalic acid. Reactor 3 is maintained such that the temperature in the reactor is about 140° C. and the pressure is about 250 p.s.i.g., agitation being provided within the reactor by means of a mechanical stirrer. After an average residence time for the reactants of about 70 minutes during which time approximately 85% of the terephthalic acid is reacted with the ethylene oxide, the effluent of the reactor is removed through line 4, passed through a motor valve 5 where the pressure is reduced to about 3 p.s.i.g., combined with 125° C. diluent xylene from line 6 and then passed to centrifuge 7. The amount of xylene added through line 6 corresponds to about one part by weight for every part by weight of reactor effluent, including solids. The reason for the addition of diluent xylene through line 6 is because the amount of xylene charged to reactor 3 is not sufficient to maintain all of the bis(2-hydroxyethyl) terephthalate formed during the reaction in solution at the temperature at which the effluent is removed from the reactor. It is not necessary that this diluent xylene be added but it is desirable that there not be two liquid phases charged to centrifuge 7.

In centrifuge 7 the liquid phase and solid phase are separated, the liquid phase being removed through line 8 and the solids being removed through line 9. Liquid stream 8 is comprised mainly of a solution of bis(2-hydroxyethyl) terephthalate in xylene but also contains some ethylene oxide, catalyst and the like. This liquid stream 8 may be treated in various manners for recovery of the bis(2-hydroxyethyl) terephthalate such as by flashing the ethylene oxide followed by cooling to effect crystallization of the diester from solution. The wetted solids removed from centrifuge 7 are mainly solid terephthalic acid wetted with xylene but also contain about 25% by weight on a dry basis of esters of terephthalic acid including mono-2-hydroxyethyl terephthalate, bis(2-hydroxyethyl) terephthalate, and oligomers thereof. Also present in amounts of less than 1% by weight are traces of catalyst and any impurities present in the terephthalic acid feed which are not soluble in the xylene, e.g. heavy metals such as cobalt. The bis(2-hydroxyethyl) terephthalate is present in the wetted solids because the liquid from which the solids are seperated, i.e. that the stream entering the centrifuge 7, is actually a solution of the terephthalate in xylene. In other words it might be stated that the solids removed from centrifuge 7 comprises terephthalic acid wetted with a solution of bis(2-hydroxyethyl) terephthalate in xylene.

The wetted solids removed through line 9 pass to a mixing tank 10 concurrently with the addition of hot xylene which is at the temperature of 125° C., the amount of hot xylene being an amount which causes the resulting solid-liquid slurry to contain about 10% by weight of solids. In actual practice centrifuge 7 is mounted on top of mixing tank 10 so that the solids merely fall into the mixing tank as they are separated from the reaction zone effluent. Mixing tank 10, which is equipped with a steam jacket and is maintained at a temperature of 125° C., contains an anchor-type agitator having four vertically extended blades which prevent buildup of solids on the tank wall. The agitator also has horizontal blades and operates at 50 r.p.m. so as to agitate the combination of wetted solids and xylene and to beat the wetted solids into particles small enough to be pumped. Mixing energy to the reslurried solids is in excess of 0.04 horsepower per gallon. After an average holdup time of about 90 minutes, a portion of the contents of mixing tank 10 is pumped by use of positive displacement pump 11 through line 12 to reactor 3, line 12 being insulated so as to maintain the temperature of the slurry flowing through line 12 at about 125° C. Periodically a portion of the slurry flowing through line 12 is purged through line 13 because of the buildup of heavy metal impurities which are introduced into the system through the terephthalic acid feed.

The foregoing description with reference to the figure is merely a description of one specific embodiment of the present invention and therefore is not to be taken in a limiting sense. As was pointed out above the reaction of terephthalic acid with an alkylene oxide in a halohydrocarbon or alkylbenzene reaction medium is well known as are methods for separation of the unreacted terephthalic acid-containing solids from the effluent of such a reaction. Thus the triethylamine catalyst could be substituted with one or more of the many other catalysts which are useful effecting such reactions and centrifuge 7 could be replaced with a filter or the like. Likewise reactor 3 could be maintained at different conditions of temperature and residence time as well as could be centrifuge 7. In regard to the operation of centrifuge 7 (or whatever separation means is used) it is preferable to operate it at above 110° C. when using either an alkylbenzene or a halohydrocarbon liquid medium.

When utilizing an alkylbenzene reaction medium for recycling the wetted solids removed from the reaction zone effluent, the temperature of the alkylbenzene added to the wetted solids must be such that the temperature of the combined solids and liquid medium is above 105° C. or below 90° C., but is preferably such that the temperature of the combined solids and the liquid medium is between 115–140° C. when utilizing the high temperature recycle or between 25–75° C. when using the low temperature recycle. In order to accomplish this the actual temperature of the liquid medium itself should generally be from about 115–145° C. in the case of the high temperature recycle and 15–70° C. in the case of low temperature recycle. In either method, the wetted solids may be first combined with the liquid medium and then added to a mixing vessel or the like or the wetted solids may be allowed to fall directly into the mixing vessel (as in the above-described specific embodiment) with the liquid medium being added to the mixing vessel separately. As an illustration, if it were desired to use a low temperature recycle in the process of the specific embodiment shown in the figure, the wetted solids exiting centrifuge 7 at a temperature of about 125° C. could be allowed to drop into a mixing vessel concurrently with the addition of 25° C. xylene to the mixing vessel, the amount of xylene being such that the equilibrium temperature of the mixture was well below 90° C., e.g. 60° C. However instead, the hot wetted solids could be first contacted with 25° C. xylene so as to quickly quench the temperature of the solids to below 90° C. and then the mixture fed to the mixing vessel which would also be maintained at below 90° C.

The foregoing remarks concerning the use of an alkylbenzene are applicable to use of halohydrocarbons except at the temperatures involved when using halohydrocarbons are different. In the case of halohydrocarbons the sticky region is between about 80° C. and 100° C. and therefore the temperature and amount of the halohydrocarbons should be such that the equilibrium temperature of the solid-liquid mixture is above 100° C. or below 80° C., but preferably between 115 to 130° C. or 25 to 80° C. depending on whether hot or cold recycle is being used, the hot recycle being preferred. Actual temperatures of the liquid halohydrocarbons which are added should generally be between about 115 and 140°

C. when utilizing a hot recycle or between about 15 to 70° C. when utilizing a cold recycle.

When utilizing a cold recycle, that is when the wetted solids separated from the reaction zone effluent are quenched with the liquid medium to below about 80–90° C., then there is no particular criticality in the time the resulting slurry is held before being recycled to the reaction zone. However, when utilizing the hot recycle, the solid-liquid slurry is preferably recycled to the reaction zone as quickly as possible so as to prevent unwanted side reactions from occurring. This is especially true when utilizing recycle temperatures above 130° C.

The embodiments of the invention in which an exclusive property or privilege is claimed are defined as follows:

1. In a process for the production of a bis(2-hydroxyalkyl) terephthalate wherein terephthalic acid suspended in an alkylbenzene or an inert halohydrocarbon liquid medium is reacted in a reaction zone maintained at a temperature of from 110–200° C. with an alkylene oxide of two to six carbon atoms in the presence of a catalyst so as to produce a bis(2-hydroxyalkyl) terephthalate, the improvement which comprises
    (a) passing the effluent of said reaction zone to a separation zone wherein wetted solids comprising unreacted terephthalic acid are separated from said effluent, said effluent and said separation zone being maintained at above 105° C. when said liquid medium is an alkylbenzene and above 100° C. when said liquid medium is a halohydrocarbon,
    (b) combining said wetted solids with an amount of said liquid medium sufficient to form a slurry containing from about 3 to 25 percent by weight of solids, the temperature of the liquid medium combined with the wetted solids being such that the temperature of the combined wetted solids and liquid medium is at least 105° C. when the liquid medium is an alkylbenzene or a temperature of at least 100° C. when the liquid medium is a halohydrocarbon,
    (c) vigorously agitating the resulting combination of wetted solids and liquid medium so as to beat the wetted solids into particles capable of being pumped, and
    (d) pumping the combined liquid medium and wetted solids to the said reaction zone, the temperature of the combined wetted solids and liquid medium during said agitation and pumping being maintained at all times above 105° C. when using an alkylbenzene or above 100° C. when using a halohydrocarbon liquid medium.

2. The process of claim 1 wherein said wetted solids contain esters of terephthalic acid in amounts of from about 0.20 to 0.75 part by weight per part by weight of terephthalic acid.

3. The process of claim 2 wherein said reaction zone is maintained at a temperature of from about 120 to 155° C., wherein said liquid medium is an alkylbenzene of 7 to 9 carbon atoms, and wherein the temperature of the liquid medium combined with the wetted solids is such that the temperature of the combined wetted solids and liquid medium is from about 115 to 140° C.

4. The process of claim 3 wherein terephthalic acid is reacted with ethylene oxide so as to produce bis(2-hydroxyethyl) terephthalate.

5. The process of claim 4 wherein said liquid medium is xylene and wherein said catalyst is a tertiary amine catalyst.

6. The process of claim 1 wherein said liquid medium is a halohydrocarbon free of ethylenic and acetylenic unsaturation and which contains from 2 to 10 carbon atoms.

7. The process of claim 1 wherein said liquid medium is chlorobenzene.

8. In a process for the production of a bis(2-hydroxyalkyl) terephthalate wherein terephthalic acid suspended in an alkylbenzene or an inert halohydrocarbon liquid medium is reacted in a reaction zone maintained at a temperature of from 110–200° C. with an alkylene oxide of two to six carbon atoms in the presence of a catalyst so as to produce a bis(2-hydroxyalkyl) terephthalate, the improvement which comprises
    (a) passing the effluent of said reaction zone to a separation zone wherein wetted solids comprising unreacted terephthalic acid are separated from said effluent, said effluent and said separation zone being maintained at above 105° C. when said liquid medium is an alkylbenzene and above 100° C. when said liquid medium is a halohydrocarbon.
    (b) quickly quenching said wetted solids by combining said wetted solids with an amount of said liquid medium sufficient to form a slurry containing from about 3 to 25 percent by weight of solids, the temperature of the liquid medium used for quench being such that the combined wetted solids and liquid medium is no greater than 90° C. when the liquid medium is an alkylbenzene or no greater than 80° C. when the liquid medium is a halohydracarbon,
    (c) vigorously agitating the resulting combination of wetted solids and liquid medium so as to beat the wetted solids in particles capable of being pumped, and
    (d) pumping the combined liquid medium and wetted solids to said reaction zone, the temperature of the combined wetted solids and liquid medium being maintained at all times during said agitation and pumping below 90° C. when using an alkylbenzene or below 80° C. when using a halohydrocarbon liquid medium.

9. The process of claim 8 wherein said liquid medium is chlorobenzene.

10. The process of claim 8 wherein said liquid medium is an alkylbenzene of from 7 to 9 carbon atoms, wherein said reaction zone is maintained at a temperature of from 120 to 155° C. and wherein the temperature of the quench liquid is such that the combined wetted solids and liquid medium is from about 25 to 75° C.

11. The process of claim 10 wherein said wetted solids contain esters of terephthalic acid in amounts of from about 0.20 to 0.75 part by weight per part by weight of terephthalic acid.

12. The process of claim 11 wherein terephthalic acid is reacted with ethylene oxide in the presence of a tertiary amine catalyst so as to produce bis(2-hydroxyethyl) terephthalate.

13. In a process for the production of a bis(2-hydroxyalkyl) terephthalate wherein terephthalic acid suspended in an alkylbenzene or an inert halohydrocarbon liquid medium is reacted in a reaction zone maintained at a temperature of from 110–200° C. with an alkylene oxide of two to six carbon atoms in the presence of a catalyst so as to produce a bis(2-hydroxyalkyl) terephthalate, the improvement which comprises
    (a) passing the effluent of said reaction zone to a separation zone wherein wetter solids comprising unreacted terephthalic acid are separated from said effluent, said effluent and said separation zone being maintained at above 105° C. when said liquid medium is an alkylbenzene and above 100° C. when said liquid medium is a halohydrocarbon.
    (b) combining said wetted solids with an amount of said liquid medium sufficient to form a slurry containing from about 3 to 25 percent by weight of solids, the temperature of the liquid medium combined with the wetted solids being either
        (i) such that the temperature of the combined wetted solids and liquid medium is at least 105° C. when the liquid medium is an alkylbenzene or a temperature of at least 100° C. when the liquid medium is a halohydrocarbon, or
        (ii) such that the wetted solids are quenched, the temperature of the resulting combination of liquid medium and wetted solids being no greater than 90° C. when the liquid medium is an alkylbenzene and no greater than 80° C. when the liquid medium is a halohydrocarbon, (c) vigorously agitating the resulting combination of wetted solids and liquid medium so as to beat the wetted solids into particles capable of being pumped, and (d) pumping the combined liquid medium and wetted solids to the said reaction zone, the temperature of the combined wetted solids and liquid medium during said agitation and pumping being maintained at all times at that temperature specified in step (b) (i) of this claim when utilizing the procedure of said step (b) (i) and being at that temperature specified in step (b) (ii) when utilizing the procedure of said step (b) (ii).

References Cited
UNITED STATES PATENTS

| | | | |
|---|---|---|---|
| 3,037,049 | 5/1962 | Vaitekunas | 260—475 |
| 3,414,608 | 12/1968 | Fujita et al. | 260—475 |
| 3,459,788 | 8/1969 | Enoki et al. | 260—475 |

LEWIS GOTTS, Primary Examiner

E. J. SKELLY, Assistant Examiner